United States Patent [19]

Floyd et al.

[11] 4,389,117
[45] Jun. 21, 1983

[54] MICROFICHE SEPARATOR AND TRANSPORT APPARATUS

[75] Inventors: Thomas D. Floyd, Morris Township, Morris County, N.J.; Roland D. Nelson; Ronald L. Bonagura, both of San Jose, Calif.

[73] Assignee: Consolidated Micrographics, Inc., Laguna Niguel, Calif.

[21] Appl. No.: 266,111

[22] Filed: May 21, 1981

[51] Int. Cl.³ .............................................. G03B 27/20
[52] U.S. Cl. ......................................... 355/87; 355/99
[58] Field of Search ....................... 355/85, 87, 99–103

[56] References Cited

U.S. PATENT DOCUMENTS

| | | | |
|---|---|---|---|
| 3,756,708 | 9/1973 | Lakin et al. | 355/27 |
| 3,810,694 | 5/1974 | Harrell et al. | 355/85 X |
| 4,082,455 | 4/1978 | Brigham | 355/100 |
| 4,178,097 | 12/1979 | Sara | 355/100 |

*Primary Examiner*—Richard A. Wintercorn
*Attorney, Agent, or Firm*—Edward A. Sokolski

[57] ABSTRACT

A microfiche separator and transport apparatus is provided comprising a first vacuum means for separating and transporting a microfiche master from a stack of masters to a platen of a microfiche duplicator. The platen is actuable from a home position to a copying station for exposing the microfiche master to a roll film and return to the home position. On the return of the platen to the home position, a second vacuum means is provided for transporting the microfiche master from the platen to an exit hopper. The operation of the first vacuum means for separating and transporting the master from the stack to the platen, and the operation of the second vacuum means for transporting the master from the platen to the exit hopper, occur simultaneously.

14 Claims, 9 Drawing Figures

MICROFICHE SEPARATOR AND TRANSPORT APPARATUS

BACKGROUND OF THE INVENTION

The present invention relates to a microfiche separator and transport apparatus for use with a microfiche duplicating machine. More specifically, the invention relates to an apparatus for separating and transporting a microfiche master from the top of a stack of masters to a platen for further transport of the master to a copying or exposure station of the duplicating machine. Following exposure of the microfiche master for a desired number of copies, the master is transported from the platen to an exit hopper.

Microforms is the general term for various kinds of film carriers having greatly reduced images thereon. Among the various microforms known in the art are aperture cards and microfiche. Aperture cards are business machine type cards having windows therein within which or over which is affixed a film carrying micro images. Microfiche, generally referred to as fiche, of various kinds are known including fiche in the form of a rectangular piece of film provided with a plurality of micro images thereon. Another form comprises a transparent plastic carrier having strips of film affixed thereto or enclosed within the carrier. A standard fiche which has received wide acceptance within the industry is the COSATI microfiche with dimensions of 105 mm by 148 mm.

Apparatus is also known for producing or duplicating fiche made from a single section of film according to COSATI or other specifications from various kinds of fiche masters. One such apparatus, for example, is shown in U.S. Pat. No. 3,756,708 assigned to the same assignee as the present invention. The apparatus disclosed therein is adapted to duplicate an unlimited number of duplicates of fiche masters.

As disclosed in the foregoing patent, the apparatus provides for feeding of a continuous strip of unexposed film from a roll film feeding station through a copying or exposure station where a fiche master may be placed in juxtaposition with a section of the unexposed film. Following exposure of the desired number of duplicate copies, the roll film is advanced to a developing station for development of the exposed section of the film. After development, the film is advanced to a cutting means and the individual fiche are separated from the continuous strip of film and transported to a collating means or a receiving hopper.

The apparatus of the above patent also comprises a platen upon which the fiche master is positioned by hand and the platen is manually moved to the exposure station into alignment with the unexposed roll film being fed through the machine. Following exposure, the platen is manually moved from the exposure station and the fiche master is removed by hand and replaced with another fiche master for a subsequent operation.

SUMMARY OF THE INVENTION

The present invention is an improvement to a fiche duplicator of the kind, for example, described in the above patent. Thus, whereas the prior art device requires a dedicated machine operator to manually place a fiche master on the platen, move the platen into the exposure station and remove the fiche master from the platen following exposure, these manual operations are performed automatically with the apparatus of the present invention. The present apparatus provides for separating a fiche master from the top of the stack, transporting the master to the platen, actuating the platen into and out of the exposure station and, following exposure, transporting the fiche master from the platen to an exit hopper.

The apparatus comprises a magazine for retaining a stack of fiche masters and a first vacuum means including a pair of flexible vacuum cups positioned with a portion of the perimeter or each of the cups overhanging an opposed marginal edge of the fiche masters in the stack. The first vacuum means is mounted on a slide member movable between an initial position in which the cups are spaced above the top of the stack and a final position in which the cups are pressed against the marginal edges of the fiche at the top of the stack. The slide member is supported on a carriage movable between a first and a second position.

In response to movement of the slide member from the initial to the final position, and supply of a vacuum source to the cups, the vacuum cups are moved downwardly against the opposed marginal edges of the fiche master at the top of the stack with sufficient force to collapse the cups. In the return movement of the slide member from the final to the initial position, the portion of each cup overhanging the marginal edge of the stack attempts to return to its original configuration due to its inherent rigidity. This action causes a bending stress to the fiche master at the top of the stack and, as this stress increases during upward movement of the slide member towards the initial position and lifting of the fiche from the top of the stack, air enters between the edges of the fiche at the top of the stack and the fiche thereunder to cause separation of only the fiche at the top of the stack.

In response to return movement of the slide member to the initial position, the carriage is moved from the first to the second position to move the first vacuum means carrying the fiche removed from the stack to a position above the platen. At this position, the vacuum source to the cups is discontinued and the fiche is released from the cups and deposited on the platen. The platen is then actuated from the home position to the copying station, the desired number of copies are duplicated and the platen is returned from the copying station to the home position.

Following exposure of the fiche master and return of the platen to the home position, the fiche is removed or lifted from the platen by a second vacuum means comprising a vacuum cup also mounted on a slide member supported on the carriage. The slide member of the second vacuum means is also movable between an initial position above the fiche on the platen and a final position in which the cup is in contact with the fiche on the platen. In response to movement of the slide member from the initial to the final position and return to the initial position, and supply of the vacuum source to the cup, the vacuum cup lifts the fiche from the platen. Movement of the carriage to the second position moves the second vacuum means carrying the fiche to an exit hopper, the vacuum source to the vacuum cup is discontinued and the fiche is released from the cup and deposited in the exit hopper.

The first and the second vacuum means are operated in timed relation such that a fiche master is separated and transported from the stack to the platen by the first vacuum means at the same time a preceeding fiche master is lifted and transported from the platen to the exit hopper by the second vacuum means. Subsequent to simultaneously depositing a fiche master on the platen and in the exit hopper, the carriage is moved from the second to the first position to return the first and the second vacuum means to a start position for a subsequent operating cycle.

It is an object of the present invention to provide a microfiche separator and transport apparatus for use with a microfiche duplicating machine for duplicating a selected number of microfiche copies from a microfiche master.

Another object is to automate the handling of the fiche masters in a duplicating machine by providing apparatus for separating a fiche from a stack of fiche masters, transporting the fiche to a platen, actuating the platen to a copying station for exposing the fiche to a roll film, withdrawing the platen from the exposure station and transporting the fiche from the platen to an exit hopper.

Another object is to provide a first vacuum means operable for separating and transporting a fiche master from the stack to the platen comprising a pair of vacuum cups, each cup coacting with an opposed marginal edge of the fiche. A portion of the periphery of each cup overhangs the edge of the stack to apply a bending stress to the fiche at the top of the stack and cause separation of only a single fiche master.

Another object is to provide a second vacuum means operable for lifting and transporting a fiche master from the platen to the exit hopper, following a copying operation, simultaneously with the operation of the first vacuum means.

Another object is to provide an automated apparatus which allows the machine operator to place a quantity of fiche masters into a magazine, set the controls and start the machine. The machine will complete all of the copies automatically thereby permitting the operator to handle several machines at the same time or perform other tasks while copies are being duplicated.

A feature of the invention is to provide an apparatus which is simple in construction and reliable in use.

Other objects, features and advantages of the invention will appear hereinafter as the description proceeds.

DESCRIPTION OF THE PREFERRED EMBODIMENT

Figures 1, 2, 3:
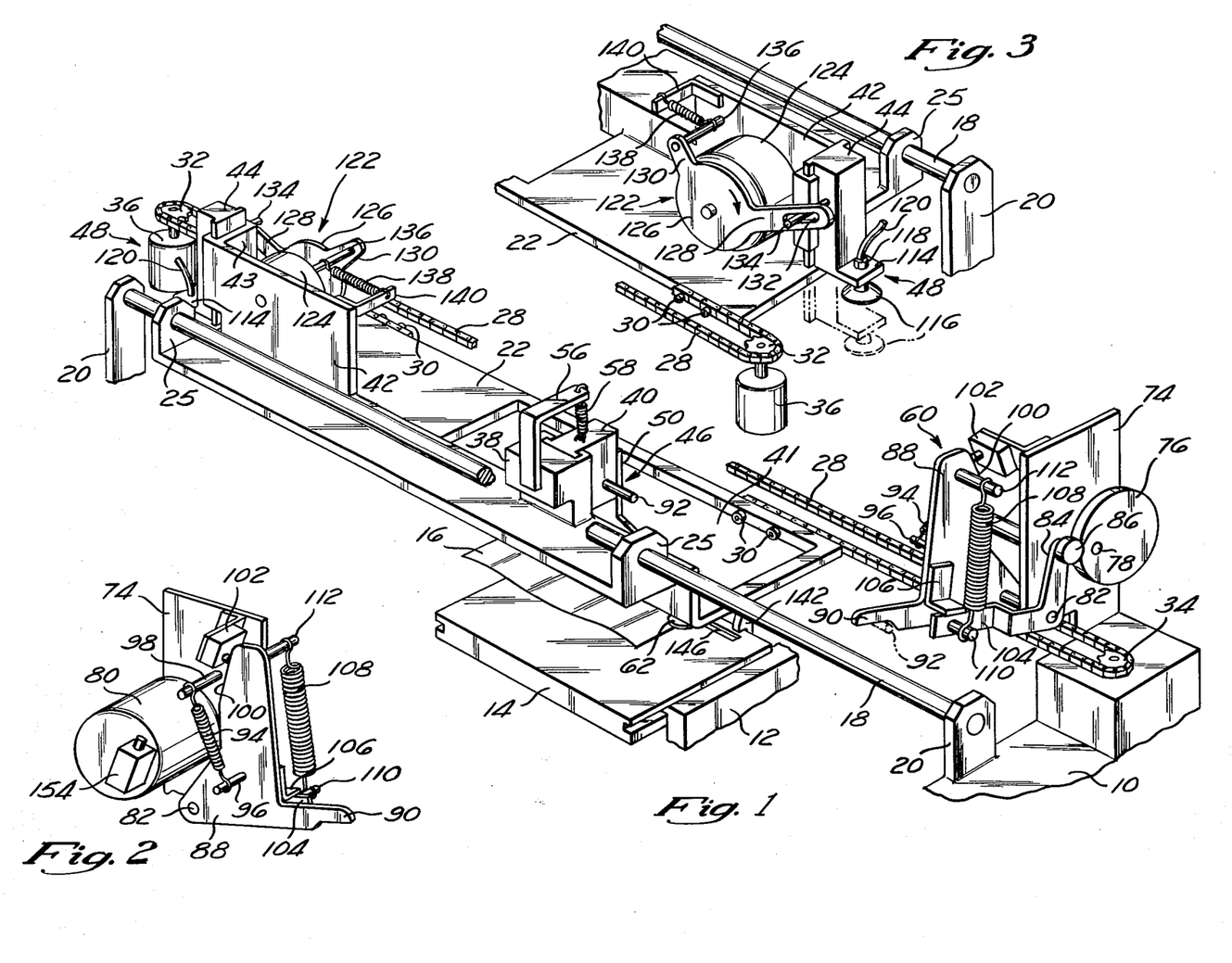
FIG. 1 is a front-right perspective view of a microfiche separator and transport apparatus in accordance with the present invention.
FIG. 2 is a perspective view of a first actuator means for operating a first vacuum means.
FIG. 3 is a perspective view of a second actuator means for operating a second vacuum means.

With reference to FIG. 1, there is shown a microfiche duplicating machine comprising a stand 10 and a frame 12. A platen 14 of glass, clear plastic or other transparent material is provided for holding a fiche master 16. The platen 14 is supported on the frame 12 for movement between a home position shown in full lines in FIGS. 1 and 4, and a copying or exposure station shown partially in phantom in FIG. 4.

The platen 14 is driven between the home position and the exposure station by a cable means comprising a drive pulley 11, an idler pulley 13, an idler pulley 15 and a cable 19. The idler pulleys 13 and 15 are mounted for rotation on the frame 12 and the drive pulley is driven by a stepper motor 17. The cable 19 is secured at one end 21 to the platen 14, then trained about the idler pulley 15, completely around the drive pulley 11, about the idler pulley 13 and secured at its other end 23 to the platen 14. Thus, in response to energization of the stepper motor 17, the cable means drives the platen 14 into and out of the exposure station.

Although not shown in the drawing, a fiche master 16 on the platen 14 at the copying station is exposed to a roll film being advanced through the duplcating machine. Following exposure of the desired number of duplicate copies of the fiche master 16, the roll film is advanced to a developing station for development of the exposed section of the film and, after development, the roll film is advanced to a cutting means and the individual fiche are separated from the roll film.

The apparatus comprises a guide rail 18 mounted in brackets 20 provided on the stand 10. A carriage 22 is provided with bearing members 25 for supporting the carriage 22 on the guide rail 18 for movement between a first position and a second position in a path (see FIGS. 4, 7 and 8) above a stack of fiche masters 24, the platen 14 and an exit hopper 26. As shown in FIGS. 1 and 3, the carriage 22 is driven along the guide rail 18 by a chain 28 secured at each free end to the carriage 22 by fastening means 30, and trained around a pair of sprockets 32 and 34, the sprocket 32 being driven by a motor 36.

Figures 4, 5, 6:
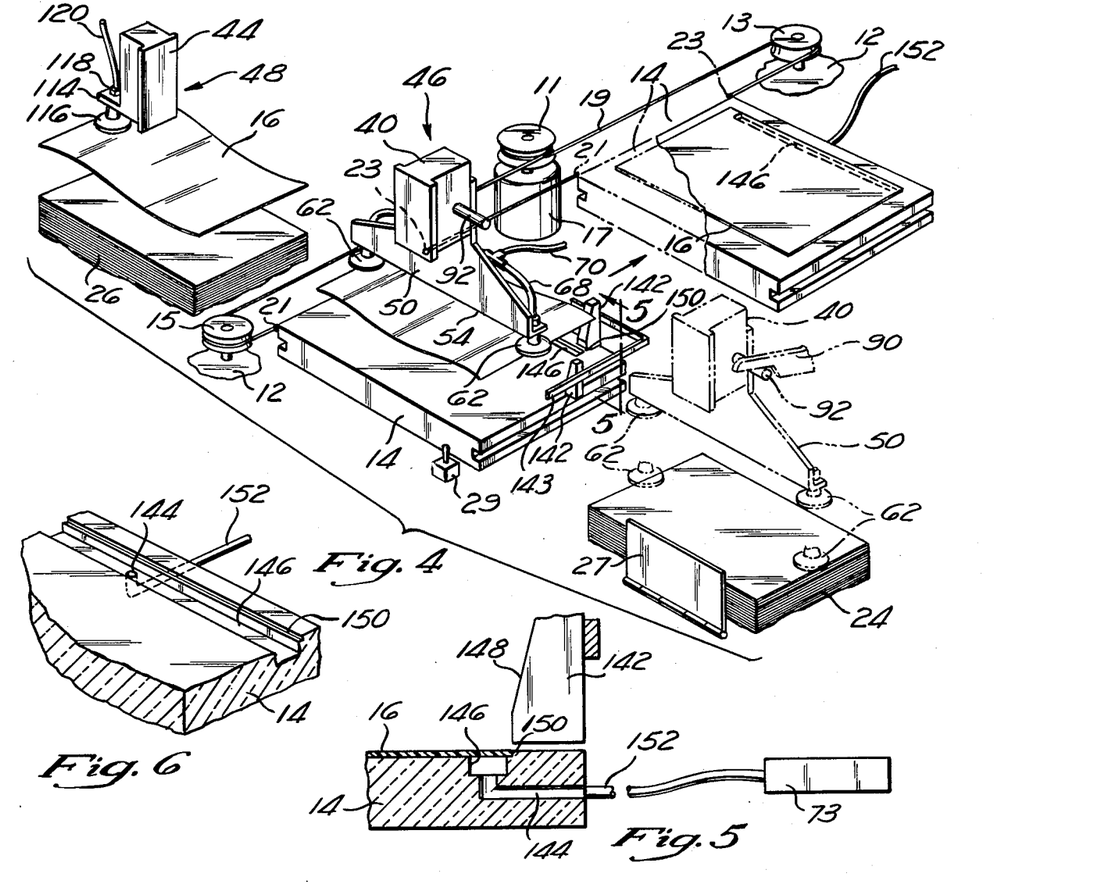
FIG. 4 is a perspective view showing a fiche master retained by the first vacuum means for deposit on the platen, and a fiche master retained by the second vacuum means for deposit in an exit hopper.
FIG. 5 is a section on the line 5—5 of FIG. 4 illustrating a vacuum port for retaining a fiche master on the platen.
FIG. 6 is a fragmentary perspective view of the platen showing the vacuum port of FIG. 5.

As shown in FIG. 1, the carriage 22 is provided with a guide block 38 for slidably supporting a first slide member 40, and a plate 42 provided with a similar guide member 43 for slidably supporting a second slide member 44. With reference to FIGS. 1 and 4, a first vacuum means indicated generally by the reference numeral 46 is mounted on the first slide member 40, and a second vacuum means indicated generally by the reference numeral 48 is mounted on the second slide member 44.

Figure 9:
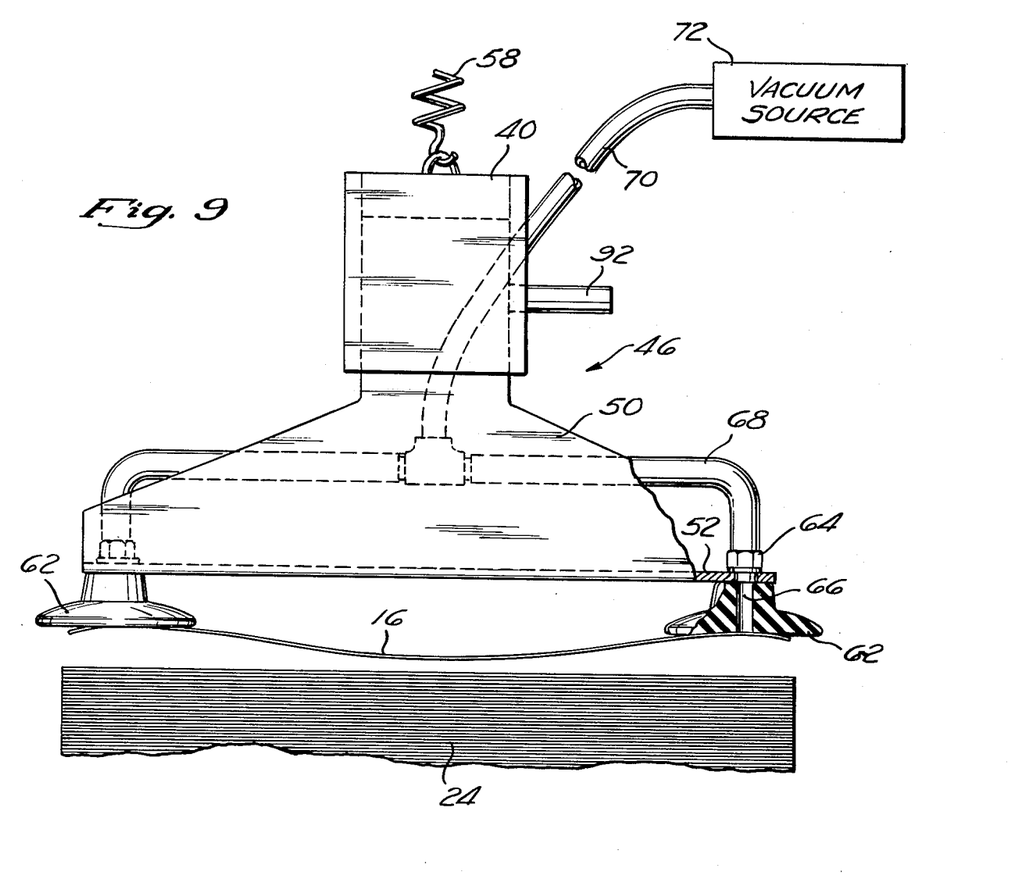
FIG. 9 is a front elevation showing the first vacuum means separating a fiche master from the top of the stack.

As shown in FIGS. 1, 4 and 9, the first vacuum means 46 comprises a generally triangular plate 50 provided with a flange 52 along a bottom edge 54. As shown best in FIG. 9, the bottom edge 54 of the plate 50 is of a length substantially equal to the length of the fiche masters in the stack 24. The guide block 38 is also provided with a bracket 56 for holding one end of a spring 58, connected between the bracket 56 and the first slide member 40, for maintaining the first slide member 40 in an initial or raised position as shown in FIG. 1. As will be described hereinafter, a first actuator means indicated generally by the reference numeral 60 is provided for moving the first slide member 40 downwardly from the initial position, through an opening 41 in the carriage 22, to a final position, against the biasing action of the spring 58.

With reference to FIGS. 4 and 9, the first vacuum means 46 further comprises a pair of flexible vacuum cups 62 each secured to the flange 52 of the plate 50 by fasteners 64. Each of the vacuum cups 62 is provided with a through aperture 66 communicating with a branch tube 68 connected with a supply tube 70 for supplying vacuum to the cups 62 from a vacuum source 72. Still referring to FIG. 9, it will be seen that each of the vacuum cups 62 is positioned to coact with a marginal edge of the stack 24 such that the aperture 66 communicates with the marginal edge of a fiche master and a portion of the perimeter of the vacuum cup 62 overhangs the edge of the stack 24. Thus, as the first slide member 40 is moved from the initial to the final position by the first actuator means 60, the first vacuum means 46 is moved downwardly with sufficient force to collapse the vacuum cups 62 against the stack 24.

In the return movement of the first vacuum means 46 from the final to the initial position, the portion of each vacuum cup 62 overhanging the marginal edge of the stack 24 attempts to return to its original configuration due to its inherent rigidity. This action causes a bending stress to the fiche master at the top of the stack 24 and, as this stress increases during upward movement of the first slide member 40 towards the initial position and lifting of the fiche master from the top of the stack, air enters between the edges of the fiche master at the top of the stack and the fiche master thereunder resulting in separation of only the fiche master at the top of the stack.

The first actuator means 60 is shown in FIGS. 1 and 2 and comprises a side plate 74 secured to the stand 10 for supporting an eccentric cam 76 on a shaft 78 of a drive motor 80. A pin 82 is fixed in the side plate 74 and at one end pivotally supports a follower arm 84 carrying a follower roller 86 coacting with the cam 76. The other end of the pin 82 pivotally supports an actuator arm 88 provided with a finger 90 adapted to coact with a pin 92 mounted in the first slide member 40 for moving the latter from the initial to the final position in response to activation of the motor 80 and operation of the cam 76. The actuator arm 88 is normally urged in a clockwise direction as viewed in FIG. 1 by a spring 94 connected to a pin 96 provided in the actuator arm 88 and a pin 98 provided in the side plate 74, as shown in FIG. 2. Through the biasing action of the spring 94, an edge 100 of the actuator arm 88 acts against a switch 102 mounted on the side plate 74 to deenergize the motor 80.

The follower arm 84 is further provided with an offset extension 104 terminating at a position in contact engagement with a stop member 106 secured to the actuator arm 88, as shown in FIG. 1, to arrest movement of the follower arm 84 in a first position. A spring 108 is connected between a pin 110 provided in the offset extension 104 and a pin 112 provided in the actuator arm 88, also as shown in FIG. 1. In response to actuation of the motor 80 for rotating the cam 76 through a single revolution, the follower arm 84 and the actuator arm 88 are pivoted in a counter clockwise direction as viewed in FIG. 1, from the first to a second position against the biasing action of the springs 94 and 108, causing the finger 90 to engage the pin 92 and drive the first slide member 40 downwardly from the initial to the final position.

The spring 108 provides a compensating means for controlling the amount of downward movement imparted to the first slide member 40 relative to the height of the fiche masters in the stack 24. Thus, the compensating means in the form of the spring 108 prevents damage to the parts which could result if the first slide member 40 were driven the same distance against a full stack of fiche masters or against a partial stack. This arrangement of the spring 108 provides for varying but uniform movement of the first slide member so as to cause the vacuum cups 62 to apply the proper amount of force against the stack regardless of the height of the stack.

With reference to FIGS. 1 and 4, the second slide member 44 is provided with a flange 114 for mounting thereon a vacuum cup 116. The vacuum cup 116 is secured to the flange 114 by a fastener 118 and is also connected to the vacuum source 72 by means of a tube 120. The second slide member 44 is also adapted to be moved from a raised or initial position as shown in FIGS. 1 and 4 and a lowered or final position as shown in phantom in FIG. 7, to remove and lift a fiche master from the platen 14 for transport to the exit hopper 26.

As shown in FIGS. 1 and 3, the second slide member 44 is moved from the initial to the final position by a second actuator means indicated generally by the reference numeral 122 comprising a rotary solenoid 124. The rotary solenoid 124 includes a disc 126 provided with a drive arm 128 and an extension 130. The drive arm 128 is provided with an elongate slot 132 for receiving a pin 134 mounted in the second slide member 44. The extension 130 is provided with a pin 136, and a spring 138 is connected between the pin 136 and an anchor 140 mounted on the guide plate 42, as shown in FIGS. 1 and 3. Thus, the disc 126 of the solenoid 124 is normally urged in a counter clockwise direction, as viewed in FIG. 3, by the spring 138 to maintain the second slide member 44 in the initial position through the action of the drive arm 128 coacting with the pin 134.

Figure 7:
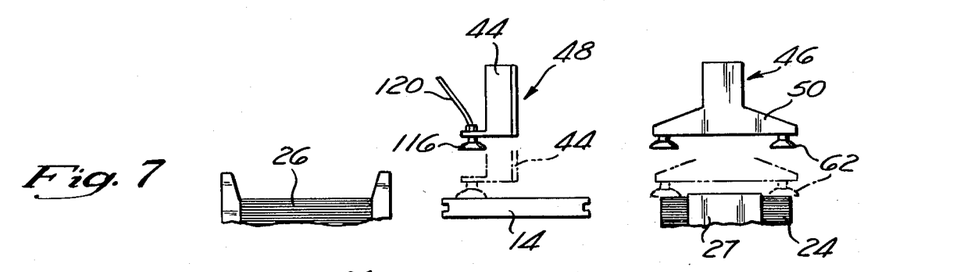
FIGS. 7 and 8 are schematic illustrations showing the sequential operation of transporting fiche masters from the stack to the platen and from the platen to the exit hopper.

In response to energization of the solenoid 124, simultaneously with energization of the motor 80, the disc 126 is rotated in a clockwise direction as viewed by FIG. 3, against the bias action of the spring 138, to cause the drive arm 128 acting on the pin 134 to drive the second slide member 44 downwardly to the final position shown in phantom in FIGS. 3 and 7. The second slide member 44 is moved from the final to the initial position by the spring 138 in response to deenergization of the solenoid 124.

With reference to FIGS. 4, 5 and 6, a pair of guide posts 142 is provided above and adjacent each edge of the platen 14, only three such guide posts 142 being shown in FIG. 4. The guide posts 142 are mounted on a support member 143 such that the guide posts 142 are suspended slightly above the platen 14, as shown in FIG. 5, to permit passage of the platen 14 thereunder in its travel between the home position and the copying station. Although not shown in the drawing, the support member 143 may be mounted on the frame 12. Each of the guide posts 142 is provided with a tapered face 148 which serves to guide a fiche master 16, released by the first vacuum means 46, into proper alignment on the platen 14. As the fiche master 16 is released by the first vacuum means 46, a lead edge of the fiche master rides along the tapered face 148 of the guide posts 142 and the fiche master is deposited on the platen 14 with the lead edge registered against a lip 150 provided on the platen 14, as shown in FIGS. 4 and 5.

The platen 14 is also provided with a vacuum port 144 communicating with a channel 146, as shown in FIGS. 5 and 6. A tube 152 supplies vacuum from a vacuum source 73 to the vacuum port 144 and, through the channel 146 communicating with the vacuum port 144, the fiche master 16 is held in place on the platen 14 during movement of the platen between the home position and the copying station and, of course, during exposure of the fiche master at the copying station. Also, the marginal edge of the fiche master 16 overlying the vacuum channel 146 is effective to close a circuit energizing the stepper motor 17 and the motor 36 to drive the platen 14 from the home position to the exposure station, and to drive the carriage 22 from the second to the first position.

Figure 8:
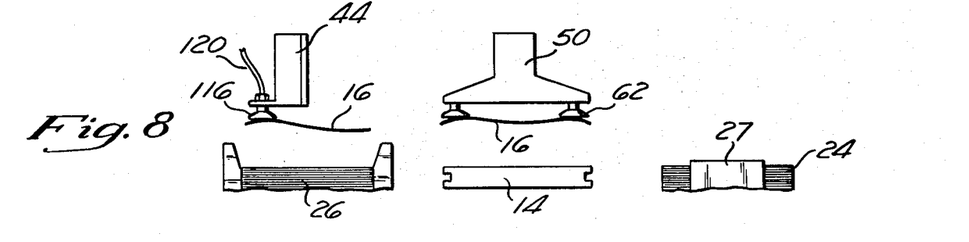

The overall operation of the device will now be described. With reference to FIGS. 4, 7 and 8, a stack o fiche masters 24 is placed in a magazine 27 at the position shown. A selectively settable counter, not shown in the drawing, may be set for the desired number of duplicate copies to be made from each fiche master. In the start position, with the carriage 22 in the first position, the first vacuum means 46 is positioned above the stack 24 and the second vacuum means 48 is positioned above the platen 14, as shown in FIG. 7.

Manual operation of a start switch (not shown in the drawing) energizes the motor 80, the solenoid 124 and the vacuum source 72 to supply vacuum to the cups 62 and 116, and deenergizes the vacuum source 73 to discontinue the vacuum supply to the vacuum port 144 and the channel 146 of the platen 14.

The motor 80 rotates the cam 76 through a single revolution, in a counter clockwise direction as viewed in FIG. 1, to pivot the follower arm 84 and the actuator arm 88 in the same direction. The pivotable movement imparted to the actuator arm 88 causes the finger 90 to act against the pin 92 thereby moving the first slide member 40 downwardly from the initial position to the final position and moving the first vacuum means 46 to the position shown in phantom in FIG. 7. The spring 108 compensates for the height of the stack of fiche masters and the vacuum cups 62 are pressed against opposed marginal edges of the fiche master at the top of the stack 24 with sufficient force to collapse the cups 62.

Continued rotation of the cam 76 results in the spring 94 imparting pivotable movement to the follower arm 84 and the actuator arm 88 in the opposite direction to restore the first slide member 40 from the final to the initial position and the first vacuum means 46 from the position shown in phantom to the position shown in full lines in FIG. 7. During the lifting action of the fiche master from the top of the stack 24, the portion of each vacuum cup 62 overhanging the marginal edge of the stack attempts to return to its original configuration due to its inherent rigidity. This action causes a bending stress to the fiche master at the top of the stack and, as this stress increases during upward movement of the first vacuum means 46 and lifting of the fiche master from the stack, air enters between the edges of the fiche master at the top of the stack and the fiche master thereunder to cause separation of only the fiche master at the top of the stack. In response to the first slide member 40 being moved from the final to the initial position, the actuator arm 88 is pivoted to the position shown in FIGS. 1 and 2 and the edge 100 of the actuator arm 88 coacts with and closes the switch 102 deenergizing the motor 80 and the solenoid 124. A brake means 154, see FIG. 2, is associated with the motor 80 to prevent over-travel of the cam 76 in its rotation through a single revolution.

Simultaneously with the movement of the first slide member 40 from the initial to the final position and return to the initial position for lifting a fiche master from the top of the stack, the solenoid 124, through the interconnection of the drive arm 132 and the pin 134, is effective to lower the second slide member 44 from the initial position shown in full lines to the final position shown in phantom in FIG. 7. While the vacuum cup 116 is moved downwardly against the platen, since a prior fiche master has not yet been delivered to the platen 14, the vacuum cup 116 is merely moved through the motions without removing a fiche master from the platen 14 in the return movement of the second slide member 44 from the final to the initial position under the influence of the spring 138.

Closing of the switch 102, by the actuator arm 88, deenergizes the motor 80 and energizes the motor 36 for moving the carriage 22 from the first position to the second position shown in FIGS. 1 and 8. In this position of the carriage 22, supply from the vacuum source 72 is discontinued to the cups 62 and 116, and the vacuum source 73 is energized to supply vacuum to the vacuum port 144 of of the platen 14. Thus, the fiche master being held by the cups 62 is released and deposited on the platen 14. The fiche master is retained on the platen 14 by the vacuum channel 146. Also, the fiche master overlying the vacuum channel effects closing a switch which energizes the stepper motor 17 for moving the platen 14 from the home position to the exposure station, and simultaneously energizes the motor 36 for returning the carriage 22 from the second to the first position.

The platen 14 remains in the exposure station until the desired number of duplicate copies have been produced and the preset counter signals the stepper motor 17 for moving the platen 22 from the exposure station to the home position shown in full lines in FIG. 4. Return movement of the platen 14 to the home position actuates a switch 29 (FIG. 4) which deenergizes the vacuum source 73 for discontinuing the supply of vacuum to the vacuum port 144 of the platen 14, and energizes the vacuum source 72 for supplying vacuum to the cups 62 and 116.

Additionally, actuation of the switch 29 is effective to energize the motor 80 and the solenoid 124 for moving the first vacuum means 46 and the second vacuum means 48 through a further cycle of operation.

However, in the next cycle of operation a fiche master is present on the platen 14. Accordingly, as the first and the second vacuum means are moved downwardly against the stack 24 and the fiche master on the platen 14 respectively, each of the vacuum means will pickup a fiche master for transport from the position shown in FIG. 7 to the position shown in FIG. 8. Here again, as the vacuum source 72 is energized to supply vacuum to the cups 62 and 116 for picking up fiche masters, the vacuum source 73 is deenergized to discontinue supply of vacuum to the channel 146 of the platen 14. Thus, the fiche master on the platen 14 is readily lifted from the platen by the second vacuum means 48 for further transport to the exit hopper. The operation continues until such time as the stack 24 of fiche masters is depleted at which time the apparatus is automatically shut down.

Although specific mechanisms and conditions are set forth in the above description, these are merely illustrative of the present invention. Other modifications and- /or additions will readily occur to those skilled in the art upon reading the disclosure, and these are intended to be encompassed within the spirit of the invention.

What is claimed is:

1. An apparatus for separating and transporting a fiche master in a fiche duplicating machine, comprising:
   a magazine for holding a stack of fiche masters;
   a platen movable between a home position and a copying station of the duplicating machine;
   carriage means movable between a first and a second position;
   first vacuum means on the carriage means operable between an initial position and a final position against the stack;
   first actuator means for operating the first vacuum means from the initial to the final position;
   first biasing means for operating the first vacuum means from the final to the initial position to effect lifting of a second fiche from the top of the stack;
   second vacuum means on the carriage means operable between an initial position and a final position against a first fiche master on the platen;
   second actuator means for operating the second vacuum means from the initial to the final position in timed relation with the operation of the first vacuum means;
   second biasing means for operating the second vacuum means from the final to the initial position to effect lifting of the first fiche master from the platen;
   drive means for moving the carriage means from the first to the second position to transport the first fiche master from the platen to an exit hopper and to transport the second fiche master from the stack to the platen; and
   means for moving the platen from the home position to the copying station to perform a copying operation and return to the home position following the copying operation.

2. An apparatus for separating and transporting a fiche master in a fiche duplicating machine, comprising:
   a magazine for holding a stack of fiche masters;
   a platen movable between a home position and a copying station of the duplicating machine;
   carriage means movable between a first and a second position;
   first vacuum means on the carriage means operable between an initial position and a final position against the stack;
   first actuator means for operating the first vacuum means from the initial to the final position;
   first biasing means for operating the first vacuum means from the final to the initial position to effect lifting of a fiche master from the top of the stack;
   drive means for moving the carriage means from the first to the second position to transport the fiche master to the platen;
   means for moving the platen from the home position to the copying station to perform a copying operation and return to the home position following the copying operation; and
   second vacuum means on the carriage means operable between an initial position and a final position against a fiche master on the platen in response to return movement of the platen to the home position;
   second actuator means for operating the second vacuum means from the initial to the final position; and
   second biasing means for operating the second vacuum means from the final to the initial position to effect lifting of a fiche master from the platen;
   said second vacuum means transporting the fiche master to an exit hopper in response to movement of the carriage means from the first to the second position.

3. An apparatus as set forth in claim 2 further comprising;
   a first vacuum source operable between an on and an off condition; and
   means responsive to movement of the platen from the copying station to the home position for operating the first vacuum source to the on condition for supplying vacuum to the second vacuum means during lifting and transport of a fiche master from the platen to the exit hopper, and for operating the first vacuum source to the off condition to discontinue supply of vacuum to the second vacuum means in response to movement of the carriage means from the first to the second position.

4. An apparatus as set forth in claim 2 in which the second vacuum means includes a vacuum cup for lifting and transporting a fiche master from the platen to the exit hopper.

5. An apparatus as set forth in claim 2 in which the second actuator means comprises:
   solenoid means cyclically operable through a single operation;
   a drive arm movable from a first to a second position in response to operation of the solenoid means for acting against and moving the second vacuum means from the initial to the final position;
   said second biasing means normally urging the drive arm to the first position; and
   switch means for deenergizing the solenoid means in response to completion of a single operation of the solenoid means and movement of the drive arm from the second to the first position under the influence of the second biasing means.

6. An apparatus for separating and transporting a fiche master in a fiche duplicating machine, comprising:
   a magazine for holding a stack of fiche masters;
   a platen movable between a home position and a copying station of the duplicating machine;
   carriage means movable between a first and a second position;
   first vacuum means on the carriage means operable between an initial position and a final position against the stack;
   first actuator means for operating the first vacuum means from the initial to the final position;
   first biasing means for operating the first vacuum means from the final to the initial position to effect lifting of a fiche master from the top of the stack;
   drive means for moving the carriage means from the first to the second position to transport the fiche master to the platen;
   means for moving the platen from the home position to the copying station to perform a copying operation and return to the home position following the copying operation;
   a first vacuum source operable between an on and an off condition; and
   means responsive to movement of the platen from the copying station to the home position for operating the first vacuum source to the on condition for supplying vacuum to the first vacuum means during separation and transport of a fiche master from the stack to the platen, and for operating the first vacuum source to the off condition to discontinue supply of vacuum to the first vacuum means in response to movement of the carriage means from the first to the second position.

7. An apparatus for separating and transporting a fiche master in a fiche duplicating machine, comprising:
a magazine for holding a stack of fiche masters;
a platen movable between a home position and a copying station of the duplicating machine;
carriage means movable between a first and a second position;
first vacuum means on the carriage means operable between an initial position and a final position against the stack;
first actuator means for operating the first vacuum means from the initial to the final position;
first biasing means for operating the first vacuum means from the final to the initial position to effect lifting of a fiche master from the top of the stack;
drive means for moving the carriage means from the first to the second position to transport the fiche master to the platen;
means for moving the platen from the home position to the copying station to perform a copying operation and return to the home position following the copying operation;
vacuum port means on the platen for retaining a fiche master on the platen during movement of the platen form the home position to the copying station;
a second vacuum source operable between an on and an off condition; and
means responsive to movement of the carriage means from the first to the second position for operating the second vacuum source to the on condition for supplying vacuum to the vacuum port means, and for operating the second vacuum source to the off condition to discontinue supply of vacuum to the vacuum port means in response to movement of the platen from the copying station to the home position.

8. An apparatus as set forth in claim 7 further comprising:
means responsive to detection of a fiche master overlying the vacuum port means for moving the platen from the home position to the copying station.

9. An apparatus for separating and transporting a fiche master in a fiche duplicating machine, comprising:
a magazine for holding a stack of fiche masters;
a platen movable between a home position and a copying station of the duplicating machine;
carriage means movable between a first and a second position;
first vacuum means on the carriage means operable between an initial position and a final position against the stack;
first actuator means for operating the first vacuum means from the initial to the final position;
first biasing means for operating the first vacuum means from the final to the initial position to effect lifting of a fiche master from the top of the stack;
drive means for moving the carriage means from the first to the second position to transport the fiche master to the platen;
means for moving the platen from the home position to the copying station to perform a copying operation and return to the home position following the copying operation; and
a pair of flexible vacuum cups mounted on the first vacuum means, each said vacuum cup positioned for engagement with an opposed marginal edge of a fiche master at the top of the stack when the carriage means is in the first position; whereby
movement of the first vacuum means from the initial to the final position moves the vacuum cups against the stack with sufficient force to collapse the cups and, during movement of the first vacuum means from the final to the initial position, the vacuum cups attempt to return to their original configuration due to their inherent rigidity thereby applying a bending stress to the fiche master to cause separation and lifting of only the fiche master at the top of the stack.

10. An apparatus for separating and transporting a fiche master in a fiche duplicating machine, comprising:
a magazine for holding a stack of fiche masters;
a platen movable between a home position and a copying station of the duplicating machine;
carriage means movable between a first and a second position;
first vacuum means on the carriage means operable between an initial position and a final position against the stack;
first actuator means for operating the first vacuum means form the initial to the final position;
first biasing means for operating the first vacuum means from the final to the initial position to effect lifting of a fiche master from the top of the stack;
drive means for moving the carriage means from the first to the second position to transport the fiche master to the platen; and
means for moving the platen from the home position to the copying station to perform a copying operation and return to the home position following the copying operation comprising cable means secured at each end to the platen and a stepper motor for driving the cable means in a first direction in response to the first vacuum means depositing a fiche master on the platen, and for driving the cable means in the opposite direction in response to completion of a copying operation.

11. An Apparatus for separating and transporting a fiche master in a fiche duplicating machine, comprising:
a magazine for holding a stack of fiche masters;
a platen movable between a home position and a copying station of the duplicating machine;
carriage means movable between a first and a second position;
first vacuum means on the carriage means operable between an initial position and a final position against the stack;
first actuator means for operating the first vacuum means from the initial to the final position;
first biasing means for operating the first vacuum means from the final to the initial position to effect lifting of a fiche master from the top of the stack;
means for moving the platen from the home position to the copying station to perform a copying operation and return to the home position following the copying operation; and
drive means for moving the carriage means from the first to the second position to transport the fiche master to the platen comprising chain means secured at each end to the carriage means and motor means for driving the chain means in a first direction in response to movement of the platen from the copying station to the home position, and for driving the carriage means in the opposite direction in response to the first vacuum means depositing a fiche master on the platen.

12. An apparatus for separating and transporting a fiche master in a fiche duplicating machine, comprising:
a magazine for holding a stack of fiche masters;
a platen movable between a home position and a copying station of the duplicating machine;
carriage means movable between a first and a second position;
first vacuum means on the carriage means operable between an initial position and a final position against the stack;
first actuator means for operating the first vacuum means from the initial to the final position comprising cam means cyclically operable through a single revolution; power means for operating the cam means; follower means pivotally movable from a first to a second position in response to operation of the cam means; third biasing means normally urging the follower means to the first position; an actuator arm pivotally movable with the follower means for acting against and moving the first vacuum means to the final position in response to movement of the follower means from the first to the second position; fourth biasing means normally urging the actuator arm to the first position; and switch means for deenergizing the power means in response to completion of a single revolution of the cam means and movement of the follower means and the actuator arm to the first position under the influence of the third and the fourth biasing means respectively;
first biasing means for operating the first vacuum means from the final to the initial position to effect lifting of a fiche master from the top of the stack;
drive means for moving the carriage means from the first to the second position to transport the fiche master to the platen; and
means for moving the platen from the home position to the copying station to perform a copying operation and return to the home position following the copying operation.

13. An apparatus as set forth in claim 12 in which the third biasing means comprises an extension spring connected between the follower means and the actuator arm for varying the final position of the first vacuum means to compensate for the height of the stack of fiche masters in the magazine.

14. An apparatus as set forth in claim 12 further including stop means on the actuator arm for arresting movement of the follower means at the first position.

* * * * *